(No Model.) 2 Sheets—Sheet 1.
F. G. BEMENT.
CAMERA STAND.
No. 405,758. Patented June 25, 1889.
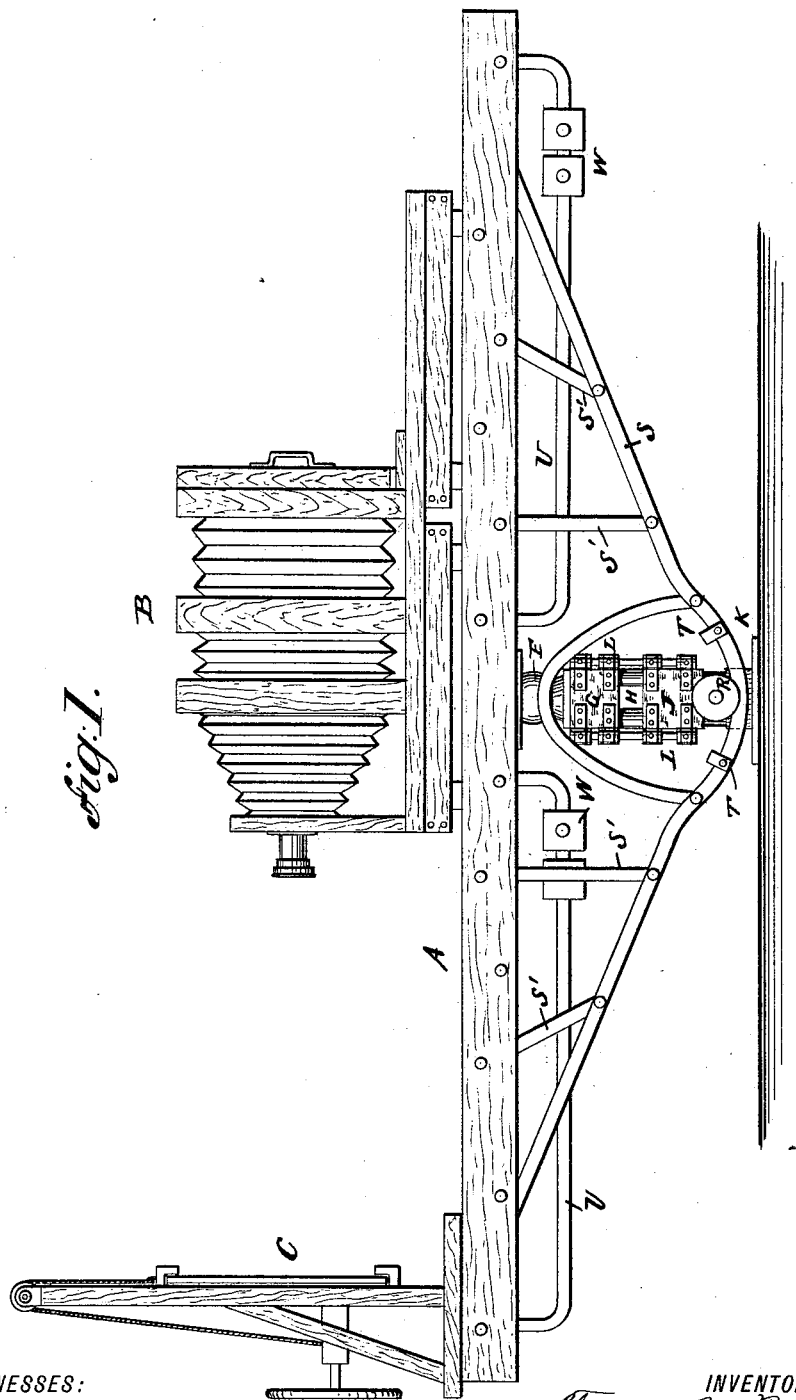
WITNESSES:
A. Schehl.
Carl Kurz
INVENTOR
Frank G. Bement
BY
Goepel & Raegener
ATTORNEYS.

(No Model.) 2 Sheets—Sheet 2.
F. G. BEMENT.
CAMERA STAND.
No. 405,758. Patented June 25, 1889.
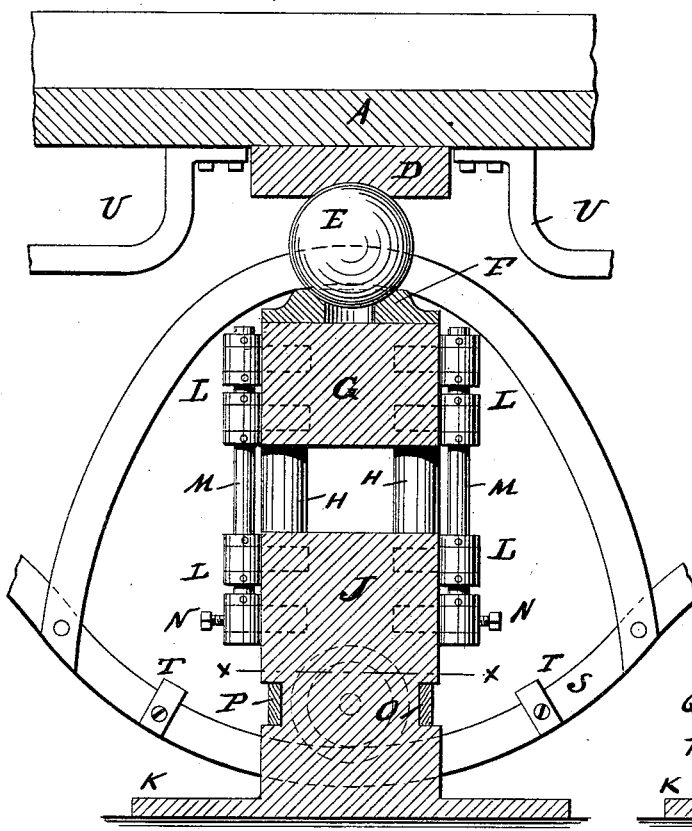
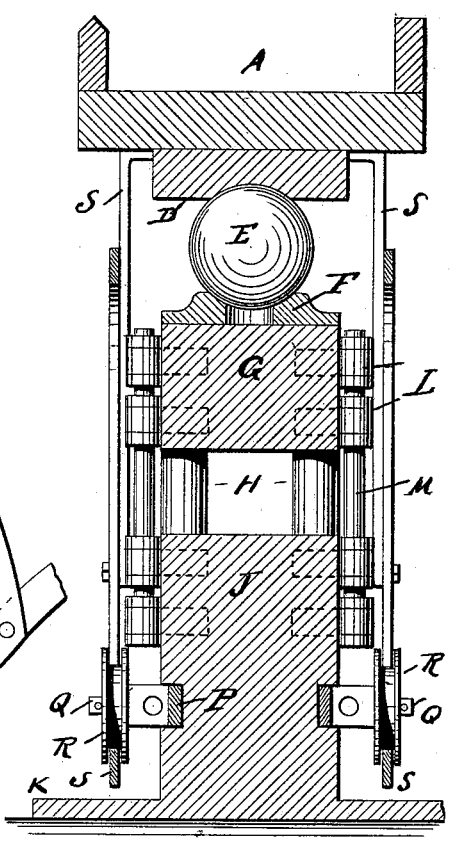

UNITED STATES PATENT OFFICE.

FRANK G. BEMENT, OF NEW YORK, N. Y., ASSIGNOR OF ONE-THIRD TO JACOB KISSINGER, OF SAME PLACE.

CAMERA-STAND.

SPECIFICATION forming part of Letters Patent No. 405,758, dated June 25, 1889.

Application filed August 10, 1888. Serial No. 282,421. (No model.)

*To all whom it may concern:*

Be it known that I, FRANK G. BEMENT, of the city of New York, in the county and State of New York, have invented certain new and useful Improvements in Camera-Stands, of which the following is a specification.

This invention relates to stands for photographic cameras, and especially for cameras which are to be used in buildings containing machinery in motion, or any other way subjected to vibrations.

The object of my invention is to provide a camera-stand that will relieve the camera from the effects of the vibration of the building; and another object of my invention is to permit of a ready adjustment of the camera at different angles or positions.

The invention consists in the construction and combination of parts and details, as will be fully described hereinafter, and finally pointed out in the claims.

In the accompanying drawings, Figure 1 is a side view of my improved camera-stand, a camera and object support being shown on the same. Fig. 2 is an enlarged detail longitudinal vertical sectional view of the central portion of the camera-stand. Fig. 3 is a transverse sectional view of the construction shown in Fig. 2; and Fig. 4 is a horizontal sectional view on line *x x*, Fig. 2.

Similar letters of reference indicate corresponding parts.

The camera B is placed upon the platform A, and can be shifted in the direction of the length of said platform toward or from a suitable support C for the object to be photographed, said support also resting on the platform. On the under side of the platform a plate D is secured at the central longitudinal and transverse lines, and is provided with a recess in its under side for receiving the upper part of a ball E, resting upon and in a socket F, with which it forms a ball-and-socket joint. The socket F is secured upon the top of a block or head G, resting upon a series of cylindrical rubber or other springs H, which in turn rest upon another block J, of greater height, which block J is provided with a base K. Sleeves L are secured on the blocks or heads G and J at the corners, and through the same rods M are passed, the lower ends of the rods M being fastened by means of set-screws N in sockets L on the lower block or head J, and the opposite ends of said rods being free to slide in the sockets L on the upper block G. The lower block or head J is provided with a cylindrical part or neck O, surrounded by a loose collar P, preferably made of two semicircular pieces bolted together, as shown in Fig. 4, and having their ends extended to form pivots, as shown in Fig. 4, on which the cylindrical grooved rollers R are mounted. On each side of the platform an approximately V-shaped rail or stretcher S is secured, the central part of which is made segmental and rests in the groove of a corresponding roller R, said rails or stretchers being connected by rods S' at various points with the platform. Stops T, which are adjustable and can be locked in place by set-screws, are mounted on the segmental parts of the rails or stretchers S and serve to limit the vertical movement of the platform. On the under side of the platform A rails U are fastened on the longitudinal central line, said rails extending from the middle toward the ends of the platform and carrying adjustable weights W, which serve for balancing the platform. The platform can be adjusted to the right or left in the horizontal plane, and turns on the ball E and cylindrical part O of the bottom head. The platform can also be adjusted vertically and then turns on the ball E as the center or fulcrum, the segmental parts of the stretchers or rails traveling on the rollers R. Said stretchers and rollers at all times hold the platform down on the ball. The rubber cushions H, being interposed between the blocks or heads J and G, prevent the transmission of any vibratory motion from the floor to the platform, as such vibratory motion is destroyed or counteracted by the springs. The rods M hold the blocks J and G in proper position in relation to each other, but at the same time permit the heads or blocks to move slightly toward or from each other.

It is evident that the rods M can be held securely in the upper eyes L and mounted to slide in the lower eyes, as this construction is the equivalent of the construction shown.

Having thus described my invention, I claim as new and desire to secure by Letters Patent—

1. In a camera-stand, the combination, with a platform, of a support composed of two parts, cushions interposed between the two parts of said support, and a ball-and-socket joint by which said platform is connected with the support, substantially as set forth.

2. In a camera-stand, the combination, with a support, of a platform connected with the support by a ball-and-socket joint, a ring surrounding the support, and rails on the platform connected with said ring, substantially as set forth.

3. In a camera-stand, the combination, with a platform, of a support, a ball-and-socket joint connecting the support and platform, a loose ring surrounding the support, rollers pivoted on said ring, and stretchers or rails secured to the platform and resting against the rims of said rollers, substantially as set forth.

4. In a camera-stand, the combination, with a support, of a platform, a ball-and-socket joint connecting the support and platform, a collar mounted to turn on the support, grooved rollers pivoted on said collar, rails or stretchers secured to the platform and resting on the rim of said rollers, and adjustable check-pieces on said rails, substantially as set forth.

5. The combination, with a support, of a platform mounted to turn and swing on said support, rails on the under side of the platform, and adjustable balancing-weights on said rails, substantially as described.

In testimony that I claim the foregoing as my invention I have signed my name in presence of two subscribing witnesses.

FRANK G. BEMENT.

Witnesses:
 OSCAR F. GUNZ,
 JOHN A. STRALEY.